Aug. 16, 1960   B. J. WISDOM   2,948,912
WIPER OF THE TYPE IN WHICH WIPING ELEMENT IS
STATIONARY AND ARTICLE TO BE WIPED IS MOVED
Filed Jan. 28, 1957

INVENTOR.
BETTY J. WISDOM

BY Fulwider, Mattingly
and Huntley ATTORNEYS

United States Patent Office 2,948,912
Patented Aug. 16, 1960

2,948,912

WIPER OF THE TYPE IN WHICH WIPING ELEMENT IS STATIONARY AND ARTICLE TO BE WIPED IS MOVED

Betty J. Wisdom, 945 Pacific Beach Drive, San Diego, Calif.

Filed Jan. 28, 1957, Ser. No. 636,612

9 Claims. (Cl. 15—250.1)

The present invention relates to wipers and more particularly to wipers of the type in which the wiping element is stationary and the article to be wiped is moved relative to the wiper.

While not limited thereto, the present invention is illustrated in connection with a dentist mirror in which the article to be wiped is the mirror. This mirror is pivotally carried on a base, disposed at one end of the handle and a motor is carried at the opposite end of the handle for imparting movement to the mirror. Preferably the support for the mirror is circular in shape and a driving wheel engages the periphery of this support for rotating the mirror.

Further objects and advantages will be apparent from the following description, reference being had to the accompanying drawings wherein a preferred embodiment of the invention is illustrated.

Figure 1:
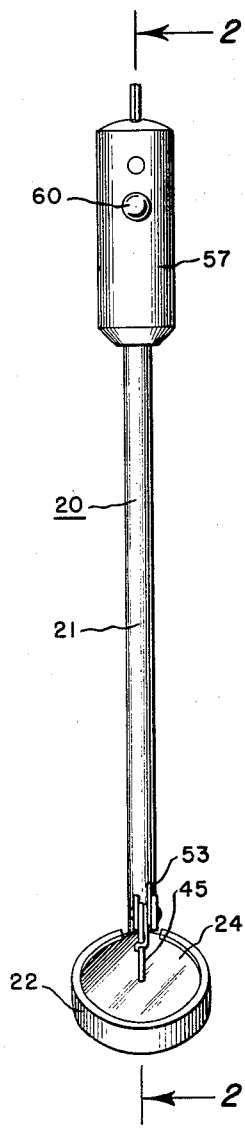
Fig. 1 is a front view of the improved dentist mirror.
Figure 2:
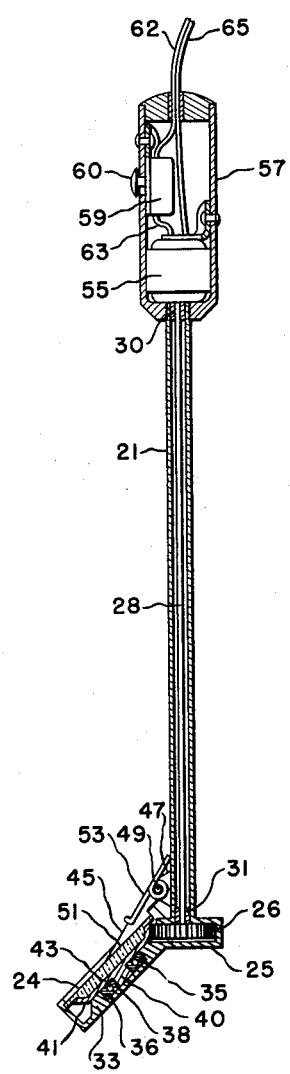
Fig. 2 is a longitudinal sectional view taken on line 2—2 of Fig. 1.

Referring more in detail to the drawings, a supporting means 20 in the form of a hollow tube 21 and an intricately formed base 22 carries the mirror 24. The base is provided with a housing 25 for a driving wheel 26. This driving wheel 26 is driven by a shaft 28. This shaft 28 is connected with the wheel 26 and is journaled in bearings 30 and 31 disposed at the top and bottom respectively of the tubular shaped handle 21. The base 22 includes a downwardly angularly extending housing 33 which is preferably circular in shape. This housing supports a thrust bearing in the form of a ball bearing 35. The outer race 36 is stationarily carried by the base 33 and the inner race 38 of the bearing is tightly secured to the stub shaft 40 of a circularly shaped support 41 for the mirror 24. The balls of the ball bearing are indicated at 43. The periphery of the support 41 is flared outwardly so as to complement the periphery of the wheel 26 and is engaged by the periphery of wheel 26 and driven thereby.

A wiper 45 is carried adjacent the lower end of the handle 21 by lugs 47 and pin 49. This wiper is formed of flexible material such as rubber, the wiping surface 51 thereof lying parallely with the exposed surface of the mirror 24. Normally this wiper is held stationary relative to the mirror 24. If desirable it may be biased toward the mirror as for example by the spring 53.

Any desirable relative movement may be imparted to the mirror 24 by the wheel 26 and in the preferred embodiment the wheel 26 is rotated in one direction only. For this purpose there is provided a motor 55 suitably carried in a housing 57. The upper end of the shaft 28 is driven by the motor. The housing is preferably carried by the upper end of the tubular handle 21. This housing also carries an "off" and "on" switch 59 which is actuated by a push button 60. Current is supplied from a source of electrical energy from a conductor 62 through the switch 59 and conductor 63 to the motor. The other side of the motor is connected to a conductor 65.

The present invention is particularly advantageous for dentists since dentists, in working upon the teeth of a patient, spend approximately one-half of their time wiping the mirror. This time is entirely wasted, and by the present invention the dentist can apply his full time to the attention of the necessary dental work.

While the form of embodiment herein shown and described constitutes a preferred form, it is to be understood that other forms may be adopted falling within the scope of the claims that follow.

I claim:

1. A dentist mirror comprising a handle; supporting means carried by the handle; an article to be wiped movably carried by the supporting means and having a mirror surface; a stationary wiper engaging the article; and means for imparting movement to the article whereby it is wiped by the wiper.

2. A dentist mirror comprising a handle; supporting means carried by the handle; an article to be wiped movably carried by the supporting means and having a mirror surface; means pivotally carrying the article on the supporting means; a stationary wiper engaging the article; and means for imparting pivotal movement to the article whereby it is wiped by the wiper.

3. A dentist mirror comprising a handle; supporting means carried by the handle; an article to be wiped movably carried by the supporting means and having a mirror surface; means rotatably carrying the article on the supporting means; a stationary wiper engaging the article; and means for imparting rotating movement to the article whereby it is wiped by the wiper.

4. A dentist mirror comprising a handle; supporting means carried by the handle; a circularly shaped article having a mirror surface to be wiped; means pivotally carrying the article on the supporting means; a stationary wiper engaging the said mirror surface to be wiped; and means engaging the periphery of the circularly shaped article for imparting pivotal movement to the article whereby said mirror surface is wiped by the wiper.

5. A dentist mirror comprising a handle; supporting means carried by the handle; a circularly shaped article having a mirror surface to be wiped; means rotatably carrying the article on the supporting means; a stationary wiper engaging the said mirror surface to be wiped; and means engaging the periphery of the circularly shaped article for imparting circular movement to the article whereby said mirror surface is wiped by the wiper.

6. A dentist mirror comprising an elongated handle; a supporting base carried by the handle; a mirror, the plane of said mirror being disposed at an obtuse angle with respect to the handle; means pivotally supporting the mirror by the base; a stationary wiper carried by the handle and engaging said mirror; a motor carried by the handle; and driving means between the motor and mirror for imparting movement to the mirror.

7. A dentist mirror comprising an elongated handle; a supporting base carried by the handle; a mirror, the plane of said mirror being disposed at an obtuse angle with respect to the handle; means rotatably supporting the mirror by the base; a stationary wiper carried by the handle and engaging said mirror; a motor carried by the handle; and driving means between the motor and mirror for imparting rotating movement to the mirror.

8. A dentist mirror comprising an elongated tubular handle; a supporting base carried by one end of the handle and disposed at an obtuse angle with respect to the handle; a circularly shaped article having a mirror surface adapted to be wiped; a stationary wiper carried by the handle and engaging the mirror surface; means pivotally supporting the article by the base; a driving wheel engaging the periphery of the circularly shaped article; a shaft connected with the driving wheel and extending within the tubular handle; and a motor carried by the other end of the handle for actuating the shaft.

9. A dentist mirror comprising an elongated tubular handle; a supporting base carried by one end of the handle and disposed at an obtuse angle with respect to the handle; a circularly shaped article having a mirror surface adapted to be wiped; a stationary wiper carried by the handle and engaging the mirror surface; means rotatably supporting the article by the base; a driving wheel engaging the periphery of the circularly shaped article; a shaft connected with the driving wheel and extending within the tubular handle; and a motor carried by the other end of the handle for rotating the shaft.

References Cited in the file of this patent

UNITED STATES PATENTS

| | | |
|---|---|---|
| 1,225,746 | Bauer | May 15, 1917 |
| 1,452,018 | Allen | Apr. 17, 1923 |
| 2,119,423 | Defibaugh | May 31, 1938 |
| 2,310,626 | Gold | Feb. 9, 1943 |
| 2,722,707 | Musselman | Nov. 8, 1955 |
| 2,737,852 | Porter | Mar. 13, 1956 |
| 2,809,430 | Barber | Oct. 15, 1957 |
| 2,814,823 | Werner | Dec. 3, 1957 |